J. F. APPLEBY.
COTTON EXTRACTING MACHINE.
APPLICATION FILED SEPT. 26, 1908.
1,060,880.
Patented May 6, 1913.
2 SHEETS—SHEET 2.
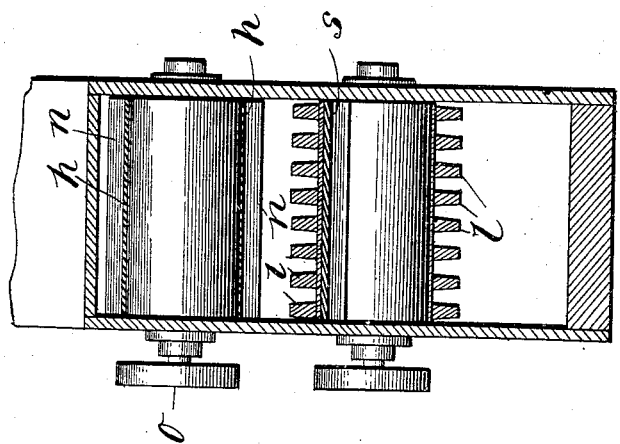
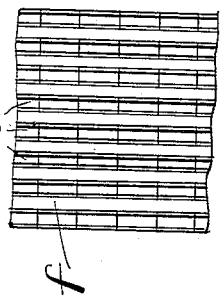
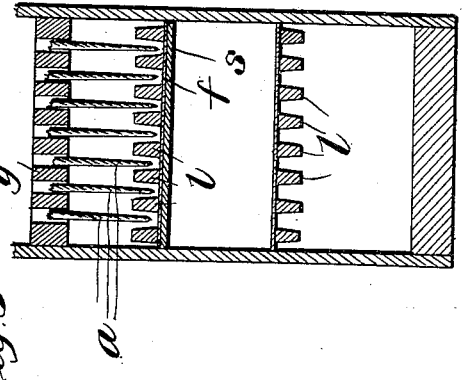
Witnesses:
Inventor:
John F. Appleby
By G. L. Grogg
Atty

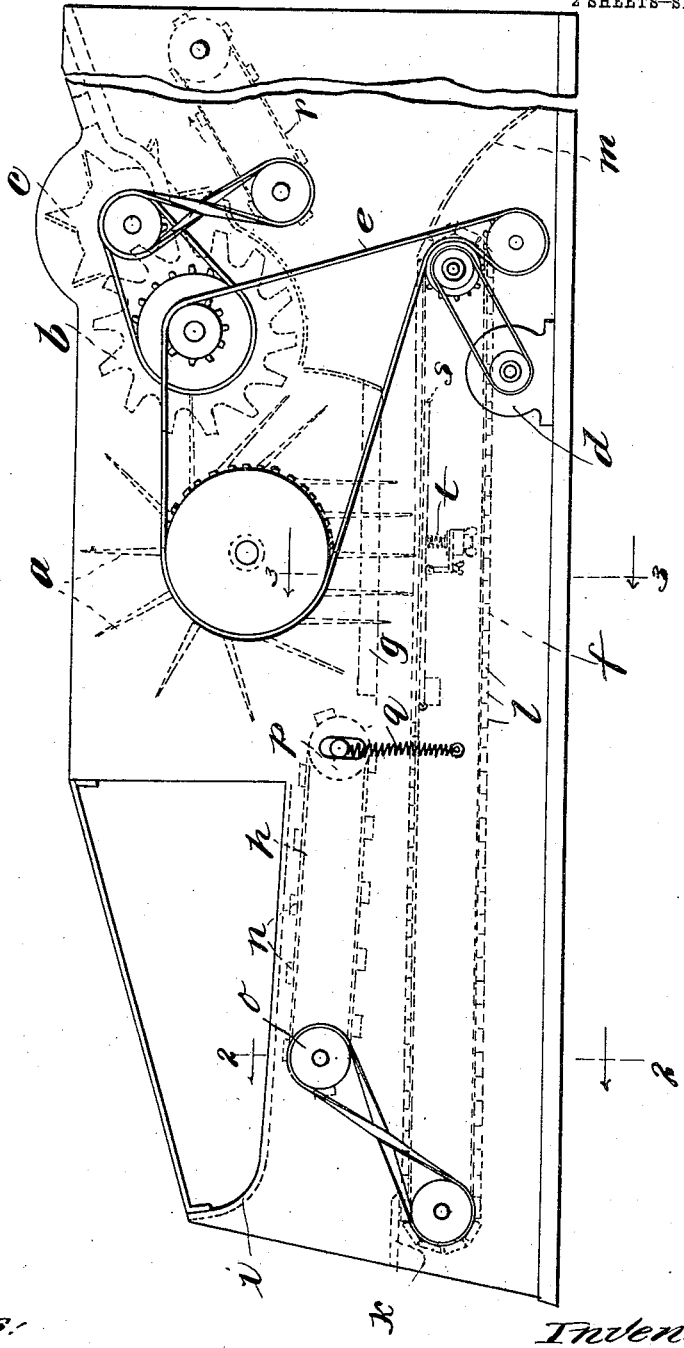

UNITED STATES PATENT OFFICE.

JOHN F. APPLEBY, OF BEAVER COUNTY, OKLAHOMA, ASSIGNOR TO DIXIE COTTON PICKER COMPANY, OF CHICAGO, ILLINOIS, A CORPORATION OF SOUTH DAKOTA.

COTTON-EXTRACTING MACHINE.

1,060,880.     Specification of Letters Patent.     Patented May 6, 1913.

Application filed September 26, 1908. Serial No. 454,863.

*To all whom it may concern:*

Be it known that I, JOHN F. APPLEBY, a citizen of the United States, residing in Beaver county and State of Oklahoma, have invented a certain new and useful Improvement in Cotton-Extracting Machines, of which the following is a full, clear, concise, and exact description, reference being had to the accompanying drawings, forming a part of this specification.

My invention relates to machines for removing cotton from harvested cotton plants, and the machine of my invention may well be termed a cotton extractor.

The invention will be best understood by a description of the preferred embodiment thereof shown in the accompanying drawings, in which—

Figure 1 is an elevation of a machine constructed in accordance with the preferred embodiment of the invention. Fig. 2 is a sectional view on line 2—2 of Fig. 1. Fig. 3 is a sectional view on line 3—3 of Fig. 1. Fig. 4 is a view in elevation of a portion of an endless conveyer entering into the construction of the machine.

Like parts are indicated by similar characters of reference throughout the different figures.

It is the general object of my invention to extract by means of suitable machinery, cotton from plants or plant portions which have been cut down or harvested. The cotton extracting machine of my invention includes extracting mechanism that employs cotton extracting fingers $a$ of suitable arrangement and construction which are rotated about their individual axes and are bodily moved, stripping mechanism $b$ for removing the cotton from the fingers $a$, cleaning mechanism $c$ for removing the cotton from the cleaning mechanism $b$, the mechanism thus far specifically described being of the general nature of the correspondingly illustrated parts shown in my patent No. 798,651, issued September 5, 1905. I do not deem it necessary, therefore, more fully to describe the structural features $a$, $b$, $c$.

In operation, the cotton extracting machine is stationarily located and is operated by means of a suitable prime mover diagrammatically indicated, for example, at $d$. This prime mover drives an endless sprocket chain $e$ which operates the extracting fingers and associate mechanism, said prime mover also operating a conveyer $f$ which desirably is in the form of an endless belt whose upper stretch is opposed to the extracting fingers $a$, which are caused in their bodily travel to project across the space intervening between the upper stretch of said conveyer belt and a slotted wall $g$ of the machine, the opposed surfaces of said slotted wall and said upper stretch of the conveyer belt affording a channel for receiving cotton plant portions, across which channel the extracting fingers are preferably caused substantially entirely to project, so that all parts of the cotton plant portions passing through said channel will be subject to the extracting operation of the fingers $a$.

The mechanism for operating the extracting fingers and the belt $f$ is such that the extracting fingers move bodily in the same direction with the upper stretch of the belt when these fingers project into the space between the upper stretch of the belt and the wall portion $g$. In this way the extracting fingers merely rotate about their individual axes in the cotton plant portions that are being conveyed through the channel space intervening between the upper stretch of the belt $f$ and the wall portion $g$. As suitable mechanism for the purpose of loading cotton plant portions upon the conveyer belt $f$ the extracting fingers $a$ are preferably caused to occupy and travel in vertical planes and to project vertically downward toward the endless belt $f$ when they have been projected through the slots in the wall $g$, though I do not wish to be limited to the vertical arrangement of the fingers. The cotton plants or plant portions are cut from the ground or otherwise removed and thereafter are discharged upon the belt $f$ which carries the plant portions beneath the belt $h$, the belts $f$ and $h$ coöperating to effect the transfer of the cotton plants or plant portions into the channel flanked by the upper stretch of the belt $f$ and the wall portion $g$. The left-hand end of the machine as illustrated in Fig. 1, is provided with a flaring throat $i$, $k$ to receive the cotton plant portions which are thereafter compressed between the belts $f$ and $h$ and transferred to the channel between the upper stretch of the belt $f$ and the wall portion $g$.

The belt $f$ may be of any suitable construction. In the embodiment of the invention shown, it is composed of an endless ribbon which carries a plurality of rows of blocks $l$, the rows being sufficiently separated to permit the entry therebetween of the free and projected ends of the extracting fingers $a$ that are thus adapted to pass entirely through all portions of the cotton plants or plant portions to insure extraction of the cotton therefrom. The blocks in each row are short in length so that as they pass about the drums that support and effect the travel of the belt, the said blocks in each row may slightly separate at their outer faces as indicated at the right and left of Fig. 1. When, however, the blocks are traveling in straight lines instead of curved lines, the spaces between the blocks in each row are closed, so that no plant portions may be pinched therebetween. In order to prevent any plant portions from being received between the separated blocks at the left of the machine, the throat portion $k$ is provided to cover the blocks during the time that they are traveling in a curved path, so that cotton plant portions deposited upon the throat portion $k$ will be prevented from being grasped between the blocks.

The discarded or discharged plant portions are discharged from the belt $f$ onto a deflecting apron $m$ to promote the removal of said plant portions, though any suitable construction may be employed for discarding or discharging the plant portions after the cotton has been extracted therefrom. The auxiliary belt $h$ desirably also includes an endless ribbon which supports cleats $n$ that are separated suitable distances. The auxiliary belt is provided with a drum $o$ at its left-hand end, which desirably has a stationary axis of rotation, and with a second drum $p$ at its right-hand end whose axis of rotation is automatically adjustable, this latter drum being spring-pressed toward the conveyer $f$ by spring mechanism $q$, so that said auxiliary belt may firmly grasp the cotton plant portions to insure their passage into the main channel where the extracting fingers operate upon the cotton. After the cotton has been extracted from the harvested plants, it is discharged from the machine by means of the cleaning wheels $c$, whereafter it may be conveyed to suitable receptacles by apparatus that need not be illustrated nor described, excepting to state that a conveyer belt $r$ enters into the mechanism that removes the cotton from the machine, this conveyer belt being located beneath the cleaning wheels $c$ that discharge the cotton upon said belt.

As an auxiliary feature I have illustrated a spring-pressed hinged shelf $s$ beneath the upper stretch of the belt $l$ and located opposite those fingers that have been projected toward said stretch of the belt, whereby said stretch of the belt is yieldingly maintained in position and is to move away from the fingers when the quantity of cotton plant portions is too great to pass through the normal channel. The construction of the spring mechanism $t$ that presses the shelf $s$ toward the upper stretch of the belt $l$ is so clear and obvious as to require no description.

I have disclosed cotton picking machines designed for use in picking cotton in the fields and in which means are employed for pressing cotton plant portions toward cotton picking mechanism in my co-pending applications 412,709, filed January 27, 1908, 446,831, filed August 3, 1908, and 444,909, filed July 23, 1908.

While I have herein shown and particularly described the preferred embodiment of my invention, it is obvious that changes may readily be made in the embodiment shown without departing from the spirit of the invention, and I do not, therefore, wish to be limited to the precise details of construction illustrated, but,

Having thus described my invention, I claim as new and desire to secure by Letters Patent the following:—

1. A cotton extracting machine having a cotton plant portion receiving channel, conveyer belt mechanism for effecting the passage of cotton plant portions through said channel, cotton extracting finger mechanism adapted to remove cotton from the plant portions passing through said channel and opposing a stretch of the belt, a wall of said channel consisting of a belt stretch, mechanism for pressing the belt stretch opposing the cotton extracting finger mechanism toward said cotton extracting finger mechanism, and additional plant portion feeding mechanism consisting of a belt coöperating with the aforesaid conveyer belt to promote the passage of the plant portions.

2. A cotton extracting machine having a cotton plant receiving channel that includes two opposed channel walls in its formation, cotton extracting mechanism including fingers that are projected through one of the walls of the channel toward the second, the first wall being slotted for this purpose, and mechanism for effecting travel of the second wall with respect to the first and for effecting passage of cotton plant portions through said channel.

3. A cotton extracting machine having a cotton plant receiving channel that includes two opposed channel walls in its formation, cotton extracting mechanism including fingers that are projected through one of the walls of the channel toward the second and which are rotated about their individual axes when projected within the channel, the first wall being slotted for this purpose, means for yieldingly pressing the second wall toward the fingers and mechanism for effecting travel of the second wall with respect to the first and for effecting passage of cotton plant portions through said channel.

4. A cotton extracting machine having a cotton plant receiving channel that includes two opposed channel walls in its formation, cotton extracting mechanism including fingers that are projected through one of the walls of the channel toward the second and which are rotated about their individual axes when projected within the channel, the first wall being slotted for this purpose, means for yieldingly pressing the second wall toward the fingers and mechanism for effecting travel of the second wall with respect to the first and for effecting passage of cotton plant portions through said channel, the fingers moving bodily in the direction of travel of the traveling channel wall while projected within the channel.

5. A cotton extracting machine including cotton extracting mechanism having cotton extracting fingers, and means for presenting cotton plant portions to and carrying them by the cotton extracting mechanism, the cotton extracting mechanism including means whereby the fingers are rotated about their individual axes and are caused bodily to travel in the same direction together with the cotton plant portions in which the fingers are rotating.

6. A cotton extracting machine including cotton extracting mechanism having cotton extracting fingers, and a belt having a stretch for supporting cotton plant portions and serving to present the cotton plant portions to the cotton extracting fingers and to carry these plant portions by the cotton extracting mechanism, the cotton extracting mechanism including means whereby the fingers are rotated about their individual axes and are caused bodily to travel in the same direction together with the cotton plant portions in which the fingers are rotating.

7. A cotton extracting machine including cotton extracting mechanism having cotton extracting fingers, means for presenting cotton plant portions to and carrying them by the cotton extracting mechanism, the cotton extracting mechanism including means whereby the fingers are rotated about their individual axes and are caused bodily to travel in the same direction together with the cotton plant portions in which the fingers are rotating; and a wall portion provided with apertures through which the cotton extracting fingers project into the cotton plant portions.

8. A cotton extracting machine including cotton extracting mechanism having cotton extracting fingers, a belt having a stretch for supporting cotton plant portions and serving to present the cotton plant portions to the cotton extracting fingers and to carry these plant portions by the cotton extracting mechanism, the cotton extracting mechanism including means whereby the fingers are rotated about their individual axes and are caused bodily to travel in the same direction together with the cotton plant portions in which the fingers are rotating, and a wall portion provided with apertures through which the cotton extracting fingers project into the cotton plant portions.

In witness whereof, I hereunto subscribe my name this 23d day of September A. D. 1908.

JOHN F. APPLEBY.

Witnesses:
L. G. STROH,
G. L. CRAGG.